Patented Dec. 28, 1943

2,337,686

UNITED STATES PATENT OFFICE 2,337,686

PROCESS FOR THE CONVERSION OF REFUSE INTO A HUMUS FERTILIZER MATERIAL

Alec Edward Sherman, London, England, assignor to Wellesley Holdings Limited, London, England, a British company No Drawing. Application July 20, 1940, Serial No. 346,518. In Great Britain July 31, 1939

7 Claims. (Cl. 71—8)

This invention is concerned with the conversion of town and house and other suitable refuse into a humus fertiliser material by a combined mechanical and biological treatment.

Refuse, particularly house and town refuse, will often contain a large proportion of paper with varying quantities of organic materials such as animal and vegetable substances and other putrescible matter. The putrescible matter is, under certain circumstances, readily convertible by bacterial fermentation with or without pre-treatment, but when the same is mixed with a predominating excess of paper it is difficult and sometimes impossible by the more generally used processes to break the same down by bacterial action.

The object of the present invention is to provide a process which will satisfactorily convert all types of refuse, even when such refuse contains an abnormal quantity of paper.

We have found that the above object is attained if conversion is effected by a three phase system of fermentation commencing with a low temperature aerobic phase, followed by a low temperature anaerobic phase and ending with a high temperature aerobic phase.

The temperature in the two low temperature phases would not, normally, exceed 40° C., whilst the temperature in the high temperature phase, which is preferably maintained in the region of 60°–65° C., may be controlled by the predetermined admission of air.

To ensure that fermentation shall commence with a low temperature aerobic phase it is necessary to pre-treat the refuse, such pre-treatment including comminution and aeration with the production of such a loosened condition of the mass at the start of fermentation that it will retain air sufficient to enable the first aerobic phase to be effected with only slight artificial aeration compared with what is required in the third or high temperature aerobic stage. If the aforesaid pre-treatment is effectively carried out and includes the addition to the comminuted refuse of a liquid culture of selected bacteria before it is introduced into the fermenting pit or cell, it will be found that the initial aerobic fermentation is due to both fungal and aerobic bacterial action both from organisms inherent to the refuse and to those added in the culture, which organisms will become active only at average temperatures below 40° C.

A process according to the present invention broadly comprises firstly pre-treating the refuse, such pre-treatment including the steps of comminution, aeration and addition of a liquid culture of selected bacteria and then subjecting the same, within a pit or cell to three phases of fermentation, said fermentation commencing with a low temperature aerobic phase due partially to the air entrained in the mass by the pre-aeration and partially to slight artificial aeration, followed by a low temperature anaerobic phase as said air becomes consumed and ending with a high temperature aerobic phase by artificially aerating the partially fermented mass.

A process as above preferably comprises the steps of opening up and mixing the raw refuse in contact with the air to bring the same into a loosened and aerated condition, comminuting the loosened and aerated refuse by grinding and/or crushing with or without previous sorting, transporting the comminuted refuse from the grinding and/or crushing plant to a fermentation pit or cell, moistening said comminuted refuse during said transportation with liquid containing bacterial culture, aerating said comminuted refuse during the said transportation by artificial and/or natural aeration, depositing the aerated refuse into the fermentation cell so that the same will form within the pit or cell a loose mass having a predetermined moisture content, closing the pit or cell against the free ingress of air for a period sufficient to allow the mass to pass through two phases of fermentation at a low temperature, the first an aerobic phase due to the air entrained in the mass by the pre-aeration assisted by slight artificial aeration followed by a gradual transition to an anaerobic phase as the entrained air is consumed, and, finally, subjecting the partially fermented mass to aerobic fermentation by artificially aerating the mass within the same or another pit or cell with simultaneous removal of vapours, said fermentation being continued until the mass has become sufficiently converted and partially dehydrated.

The pre-treatment of the refuse before fermentation is, as previously stated, for the purpose of ensuring that the refuse will take up sufficient air for the initial aerobic stage to become effective with only slight artificial aeration. This may be determined by ascertaining the extent of the fungal activity in the fermenting mass. If the fungal growth is insufficiently extensive the period of low temperature aerobic fermentation is too short due to insufficient air within the mass. This can be remedied either by effecting more extensive loosening of the refuse during pre-treatment or by increasing the artificial aeration during this first phase, or by both methods.

We have found that three days represents a sufficient period for the first aerobic fermentation but this period may of course vary according to the nature of the refuse under treatment. If, for instance, the paper content is low the period may be reduced and vice-versa. As the development of fungal mycelia is desirable from the point of view of cellulose degradition and the formation of humus it is inadvisable unduly to curtail the first stage of fermentation.

The application of artificial aeration during the first or low temperature aerobic phase is for the dual purpose of controlling both the period of the phase and the required gradual rise in the temperature of the mass. The amount of air introduced into the mass during this phase and whether the introduction shall be continuous or intermittent are under the control of the operator and are determined by observations both of the fungal activity of the mass and of its temperature.

In practice the application of artificial aeration during the first phase of fermentation is preferably such that this phase proceeds for a period of not less than three days and so that the temperature will rise gradually to a figure which approaches but which does not exceed 40° C.

The following is a description of one manner of carrying out the process of the present invention:

The crude refuse as it arrives at the plant is tipped into a receiving hopper. If the same is caused to fall from a height this tipping will initiate the opening up and mixing of the refuse. From this hopper the refuse is removed either by a grab or by an elevator conveyor and caused to fall or otherwise to be deposited as a comparatively thin layer onto a picking belt. The picking belt carries the same past one or more operators who, in turning the material over for the sorting out of bottles, tins and other inorganic materials, cause further opening up and mixing of the refuse, and its natural aeration, initiated when the same is tipped into the receiving hopper, to proceed.

The sorted material on the picking belt may be carried to a magnetic separator belt for the removal of any remaining and suitable metal articles. The refuse may then proceed by a main elevator belt either to a suitable mixer and then to a grinding or crushing plant or direct to said grinding or crushing plant. This grinding or crushing plant may comprise two units, a primary crushing unit followed by a macerating unit. Alternatively the primary crushing unit may be dispensed with. During its passage through the grinding or crushing plant the refuse will become intimately mixed and comminuted to a state of sufficient sub-division as well as becoming extensively aerated.

The comminuted material as it leaves the grinding or crushing plant is delivered, as a comparatively thin layer, on to a belt or other open conveyor for transference by the same or other conveyor to a fermentation pit or cell. To ensure that the material shall be adequately aerated whilst on this conveyor or series of conveyors it is advisable that the distance travelled by the comminuted refuse on its way to the pit or cell shall be sufficiently long to maintain aeration. If the aeration effected naturally during this transference of the comminuted refuse is found to be insufficient for the purpose of carrying out the first aerobic fermentation stage, the natural aeration may be augmented artificially by directing air onto the moving stream of refuse by jets, deflectors or other suitable means. Alternatively the comminuted refuse may be carried from the grinding or crushing plant to the fermentation pit or cell by blowing the same through a pipe or duct by air under pressure. This method may be used either alone or in conjunction with a mechanical conveyor.

During the passage of the comminuted material from the grinding or crushing plant to the fermentation pit or cell it is sprayed with a liquid culture of selected bacteria. The culture consists of suitable putrefactive, cellulose-splitting, nitrogen-fixing, and other suitable organisms.

These organisms are employed for the purpose of augmenting the activity of the natural and inherent bacterial flora of the refuse and are selected primarily for their action in the aerobic phases.

The addition of the bacterial culture to the comminuted refuse increases, of course, its moisture content but when this moisture content is below about 45% it is advisable to add further liquid to the refuse as it enters the fermentation pit or cell. A liquid suitable for adding to the refuse at this stage is scrubbed-liquor containing ammoniacal compounds and derived from the washing of the gases evolved during fermentation.

In determining the required moisture content of the refuse as it enters the fermentation pit or cell it is necessary to ensure that the refuse when in the pit or cell shall have a moisture content as near 45% as is compatible with its retaining its loosened condition.

When the pit or cell has been sufficiently filled with the pre-treated refuse it is closed against the free ingress of air, and the refuse will then go through the first two phases of fermentation, viz. an aerobic phase due principally to the entrained air when assisted by slight artificial aeration and to the organisms inherent to the refuse and those added in culture and then an anaerobic phase, this latter phase occurring gradually after artificial aeration has ceased as the air entrained in the refuse by the pre-aeration becomes consumed.

During the first phase the degradation of the cellulose in the refuse is initiated and the development of the fungi reaches a maximum. This phase should continue for approximately three days.

The anaerobic phase which follows naturally on the first phase is also brought about by the consumption of air by the fungi and aerobic bacteria and the resultant activity of the anaerobic bacteria inherent in the refuse. During this phase the fungal activity which occurs during the first phase comes largely to a standstill. The fungal mycelia die and become, to a great extent, decomposed by the action of the anaerobic bacteria.

In both of the above stages the temperature of the fermenting mass should always remain within the optimum range, that is below an average of 40° C.

The final aerobic phase is started and carried through by artificially aerating the partially fermented mass in the same manner as in the first phase but to a much greater extent, such as by blowing air under pressure into the mass or by applying suction to the interior of the pit or cell so that the air is drawn in.

During this final aerobic fermentation the temperature of the mass will rise until a temperature in the region of 60° C.–65° C. is attained, whilst the fermentation will proceed largely as a result of the previously introduced cultured bacteria. This relatively high temperature, which may be controlled by suitably regulating the volume of artificially introduced air, results in the lethalisation of all putrefactive bacteria and produces copious steaming of the mass with a resulting dehydration. The vapours thus evolved are withdrawn from the fermentation chamber and may be passed through a scrubber for the production of the aforesaid ammoniacal liquors.

This final aerobic phase may be allowed to continue to a date about 16 days distant from the day of filling the cell when the resulting product will be found to be a partially de-hydrated humus having valuable fertilizing and other properties, the said product being of a loose earthy nature, similar in texture to the finer grades of fibrous leaf mould.

I claim:

1. A process for the conversion of refuse containing entrained air into a humus fertilizer material, which consists in successively subjecting the refuse while in a closed cell to three stages of fermentation; firstly, an aerobic phase at a temperature not exceeding 40° C. during which sufficient air is maintained in the refuse for a period of at least three days so that maximum fungal development within this temperature range is attained, secondly, a low temperature anaerobic phase, and thirdly, a high temperature aerobic phase.

2. A process for the conversion of refuse containing entrained air into a humus fertilizer, which consists in successively subjecting the refuse while in a closed cell to three stages of fermentation; firstly, an aerobic phase at a temperature not exceeding 40° C. during which sufficient air is maintained in the refuse for at least three days so that maximum fungal development within this temperature range is attained, secondly, an anaerobic phase at temperatures not exceeding 40° C. and, thirdly, an aerobic phase at temperatures up to 65° C.

3. A process for the conversion of refuse into a humus fertilizer, which consists in successively subjecting the refuse while in a closed cell to three stages of fermentation; firstly, a phase during which the refuse is aerated at a temperature not exceeding approximately 40° C. for such time that maximum fungal development within this temperature range is attained for providing a low temperature aerobic fermentation, secondly, a phase in the absence of air to provide a low temperature anaerobic fermentation and, thirdly, a phase during which the refuse is aerated sufficiently to provide a high temperature aerobic fermentation.

4. A process for the conversion of refuse containing entrained air into a humus fertilizer, which consists in successively subjecting the refuse while in a closed cell to three stages of fermentation; firstly, a phase during which sufficient air is added to that entrained in the refuse and the same maintained at temperatures up to 40° C. for such time that maximum fungal development within such temperature range is attained for providing an aerobic fermentation, secondly, a phase in the absence of air and at temperatures not exceeding 40° C. to provide an anaerobic fermentation and, thirdly, a phase during which sufficient air is added to the refuse at temperatures not exceeding 60° C. to provide an aerobic fermentation.

5. A process for the conversion of refuse into a humus fertilizer material comprising the steps of subjecting refuse, pretreated by comminution, mechanical entrainment of air and inoculation with liquid culture of preselected bacteria, within a closed cell to three stages of fermentation; firstly, an aerobic phase at a temperature not exceeding 40° C. during which sufficient air is maintained in the refuse for at least three days, so that maximum fungal development within this temperature range is attained, secondly, a low temperature anaerobic phase, and thirdly, a high temperature aerobic phase.

6. A process for conversion of refuse into a humus fertilizer material comprising the steps of subjecting refuse pretreated by comminution, mechanical entrainment of air and inoculation of liquid culture of preselected bacteria, within a closed pit to three stages of fermentation; firstly, a phase in which sufficient air is added to that entrained in the refuse, and the same maintained at temperatures not exceeding 40° C. and for such time that maximum fungal development within this temperature range is attained to provide a low temperature aerobic fermentation, secondly, a phase in the absence of air to provide a low temperature anaerobic fermentation and, thirdly, a phase during which sufficient air is added to the refuse to provide a high temperature aerobic fermentation.

7. A process for the conversion of refuse into a humus fertilizer material, comprising steps of subjecting refuse, pretreated by comminution, mechanical entrainment of air and inoculation of liquid culture of preselected bacteria, within a closed pit to three stages of fermentation; firstly, a phase in which sufficient air is added to that entrained in the refuse and the same maintained at temperatures not exceeding 40° C. for a period of at least three days so that maximum fungal development within this temperature range is attained to provide a low temperature aerobic fermentation, secondly, a phase in the absence of air to provide a low temperature anaerobic fermentation and, thirdly, a phase during which sufficient air is added to the refuse to provide a high temperature aerobic fermentation.

ALEC EDWARD SHERMAN.